Nov. 21, 1950     R. O. HAMILL     2,531,038
MECHANISM FOR TRANSFERRING A MAXIMUM DEMAND INDICATION FROM
ONE INDICATOR TO ANOTHER INDICATOR WHEN THE FORMER IS
RESTORED TO ITS INITIAL POSITION
Filed Jan. 30, 1947     2 Sheets-Sheet 1
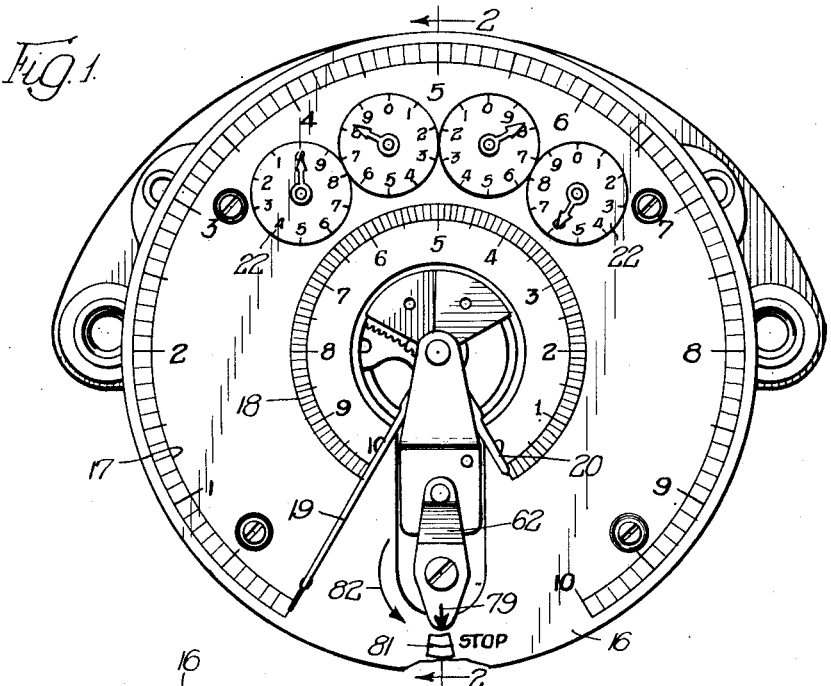
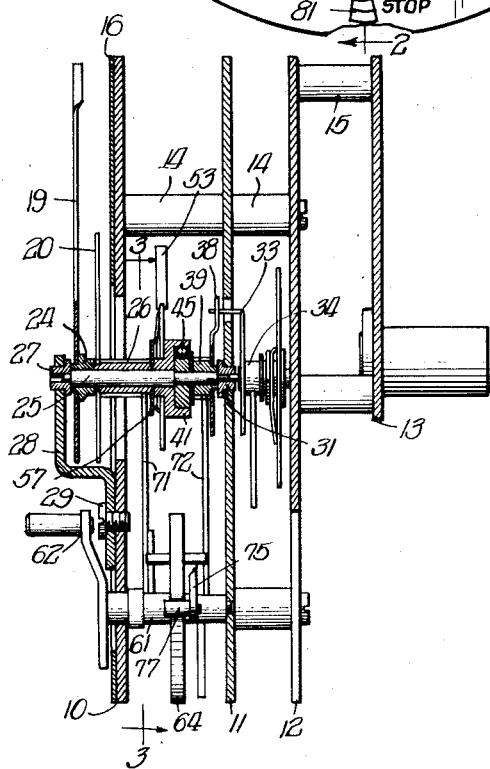
INVENTOR.
Ret O. Hamill,
BY Brown, Jackson,
Boettcher & Diemer
attys.

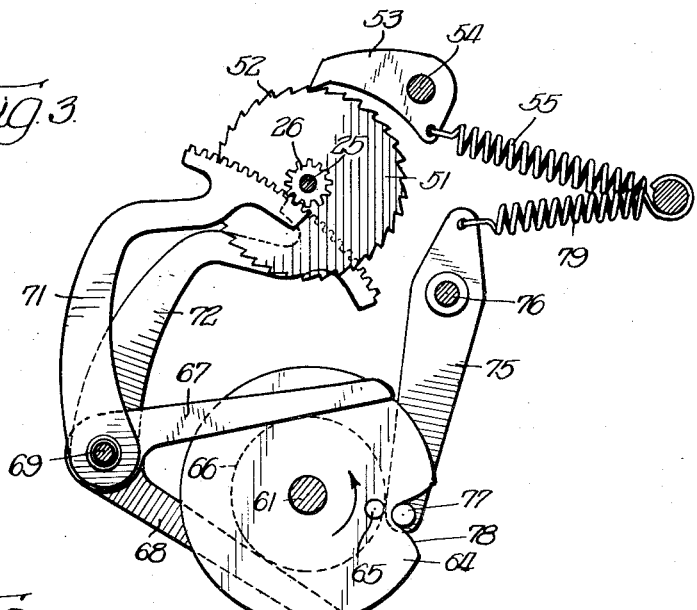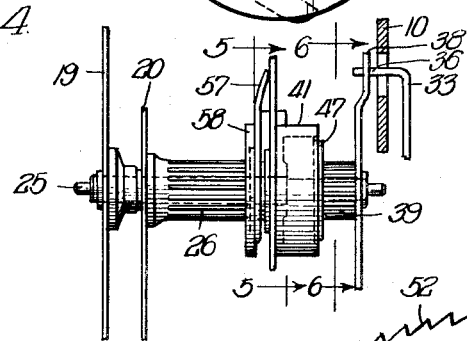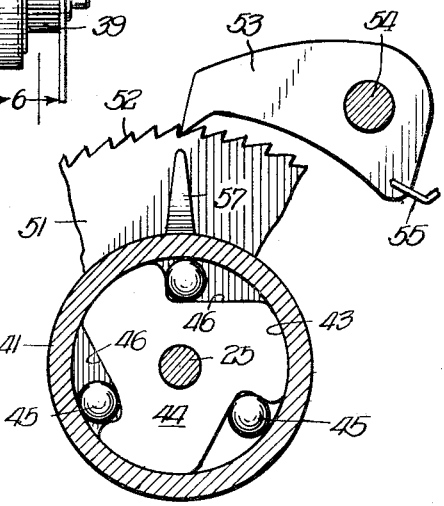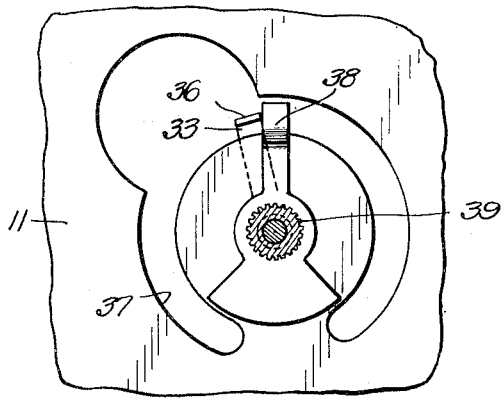

Patented Nov. 21, 1950

2,531,038

UNITED STATES PATENT OFFICE 2,531,038

MECHANISM FOR TRANSFERRING A MAXIMUM DEMAND INDICATION FROM ONE INDICATOR TO ANOTHER INDICATOR WHEN THE FORMER IS RESTORED TO ITS INITIAL POSITION

Ret O. Hamill, New Era, Mich.

Application January 30, 1947, Serial No. 725,236

3 Claims. (Cl. 235—144)

The present invention relates to an improved maximum demand indicator for electric meters and the like. More specifically, the invention is directed to that type of maximum demand indicator that gives an indication of the maximum demand for the previous month or previous billing period, in addition to the maximum demand for the current month or current billing period. This is advantageous for several reasons. For example, it is advantageous for settling customer's disputes as to the amount of the charge based upon maximum demand loads, because the device automatically retains the meter reading in a transposed position upon another dial for approximately one month after the taking of that reading and the billing of that maximum demand load. Also, by giving an indication of the maximum demand for the previous month, in addition to the maximum demand for the current month, the meter reader is enabled to check the accuracy of the record made for the previous month's maximum demand. Also, by having the indicator give an indication of the maximum demand for the previous month, in addition to the maximum demand for the current month, there is practically eliminated the possibility of a reading becoming lost, such as can happen when a meter reader resets the maximum demand indicator before he makes a record of the reading of that indicator.

The general object of the present invention is to provide improved mechanism actuated by the meter reader in the resetting operation for, first, resetting the previous month's indicator to zero and then transferring the reading of the current month's indicator to this previous month's indicator.

One of the features of this improved operating mechanism is that it is entirely positive in its operation, and does not rely upon spring energy, or the like, to reset the previous month's indicator to zero, or to transfer the current month's reading to the previous month's indicator. That is to say, in the performance of the resetting operation, the meter reader is enabled to transmit a positive drive to the previous month's indicator for resetting this indicator to zero, and he is also enabled to transmit a positive drive for transferring the current month's reading to the previous month's indicator. This positive drive minimizes or prevents difficulties which are likely to arise in spring actuated devices, because of spring breakage, stiffness of lubrication, corrosion of parts, etc.

Another feature of this improved operating mechanism is that there is nothing critical about the speed at which the meter reader performs the resetting operation. That is to say, the meter reader can rotate the resetting crank at a very rapid rate, or at a very slow rate, without the possibility of erroneous operation. The above-mentioned positive drive to the two indicator members avoids any necessity of having to operate the mechanism at a speed above or below a critical speed.

Other features of this improved operating mechanism reside in a ratchet mechanism which holds the current month's indicator against advancing motion, while the previous month's indicator is being reset to zero; also in a friction slippage clutch which permits this resetting motion of the previous month's indicator relatively to said ratchet mechanism; and, furthermore, in an overrunning clutch or one-way drive device which transmits the motion from the current month's indicator to the previous month's indicator when the current month's indicator is being reset to zero. By virtue of this overrunning clutch in the operating mechanism, the current month's indicator is made completely free of the previous month's indicator during the normal operation of the apparatus during the course of the month, so that the mechanism does not impose any frictional load upon the current month's indicator, and hence the apparatus imposes no additional load upon the rotating elements of the electric meter.

Other features, objects and advantages of the invention will appear from the following detailed description of one preferred embodiment of the invention. In the accompanying drawings illustrating such embodiment:

Figure 1 is a front elevational view of this preferred embodiment of my maximum demand apparatus;

Figure 2 is a longitudinal or axial sectional view taken approximately on the plane of the line 2—2 of Figure 1;

Figure 3 is a detailed sectional view taken approximately on the plane of the line 3—3 of Figure 2, showing the resetting crank pin, the resetting arms and resetting sectors;

Figure 4 is a fragmentary elevational view showing the assembled relation of the resetting pinions, ratchet mechanism, slippage clutch and overrunning clutch;

Figure 5 is a fragmentary transverse sectional view taken approximately on the plane of the line 5—5 of Figure 4, showing the operating relation between the ratchet mechanism and the overrunning clutch; and Figure 6 is a detailed sectional view taken on the plane of the line 6—6 of Figure 4, showing the motion transmitting pusher connection from the electric meter to the maximum demand indicator.

The assembly illustrated in Figures 1 and 2 is a maximum demand register which can be applied to a conventional watthour meter, or to a thermal type of demand meter, or to any other type of meter device in which it is desired to register maximum demands. The meter itself is not shown in the drawings, because meter structures of these types are well known to those skilled in the art. The present demand register combines a plurality of spaced supporting plates 10, 11, 12 and 13, which are held in spaced relation by suitable spacing posts or sleeves 14 and 15. Secured to the front side of the front supporting plate 10 is a dial plate 16 on which are marked concentric outer and inner circular scales 17 and 18 (Figure 1). The first or outer scale 17 reads in a clockwise direction from its zero value to its maximum value, and constitutes the current month's maximum demand scale. The second or inner scale 18 reads in the opposite or counter-clockwise direction from its zero value to its maximum value, and constitutes the previous month's maximum demand scale. Swinging over the outer scale 17 is a pointer 19 which cooperates with the scale 17 for indicating the maximum demand of the current month, or other maximum demand interval being measured. Swinging over the inner scale 18 is a shorter pointer 20 which cooperates with the inner scale for indicating the maximum demand of the previous month, or of such other maximum demand interval as is being indicated by the device. The two pointers 19 and 20 are concentrically mounted for pivotal movement about the same axis, and to accentuate the distinction between the current month's demand indication and the previous month's demand indication, the first scale 17 and first pointer 19 are preferably colored black, and the second scale 18 and second pointer 20 are preferably colored red, it being understood, however, that other contrasting colors may be used. Attention is again directed to the fact that the advancing motion of the first pointer 19 is in a clockwise direction, whereas the advancing motion of the second pointer 20 is in a counter-clockwise direction, from which it will be seen that when the present month's pointer 19 is being reset at the end of the month, its counter-clockwise direction can be imparted to the previous month's pointer 20 for causing this latter pointer to move in an advancing direction. This will hereinafter appear in more detail in the subsequent description of the resetting mechanism. Totalizing register dials 22 may be located between the outer and inner arcuate scales at the upper portion of the dial plate for totalizing the accumulative maximum demand over the entire operating period of the meter. These totalizing dials are conventional equipment in maximum demand meters, and form no part of the present invention.

Referring to Figures 2 and 4, the current month's demand pointer 19 is secured to a hub 24 which is staked, or otherwise made fast, to a main staff or spindle 25. The previous month's demand pointer 20 is secured fast to a resetting pinion 26 which is freely rotatable upon the central shaft 25 directly behind the hub 24. A reduced front end of the central staff or spindle 25 has bearing support in a bearing bushing 27 mounted in an angular bearing bracket 28 which has its lower end secured to the front supporting plate 10 by a screw 29 and associated staking pins. A reduced rear end of the central shaft 25 has bearing support in a bearing bushing 31 which is mounted in the second supporting plate 11.

Motion is transmitted from the electric meter to the above described demand indicator mechanism through the instrumentality of a demand actuated primary element, preferably in the form of a pivotally swinging pusher arm 33 (Figures 2, 4 and 6). This pusher arm 33 is rotatably mounted on a shaft 34 which has its front end supported in the bearing bushing 31 and has its rear end supported in the supporting plate 12. In the case of an integrating watthour or block interval type of meter, this pusher arm 33 will be advanced upscale in a clockwise direction (Figures 1 and 6) at a rate of speed proportional to the prevailing quantity consumption rate, being returned or reset periodically to zero every fifteen minutes or every thirty minutes by an automatic interval timing mechanism, as is well known to those skilled in the art. In the case of a thermal type of demand meter, the pusher arm 33 will be pushed upscale in a clockwise direction to a distance proportional to the maximum demand, as determined by the heat storage capacity of the meter, this pusher arm being then reset at the end of the month or other meter reading interval. This pusher arm has a forwardly bent end 36 which swings through an arcuate slot 37 punched in the supporting plate 11 (Figure 6). This forwardly projecting end is adapted to engage the left hand edge of a driving arm 38, which is secured fast to a resetting pinion 39, this resetting pinion being in turn staked or otherwise secured fast to the rear end of the central spindle 25. Thus, the pusher arm 33 is always operative to transmit more and more advancing motion to the current month's demand pointer 19 through the one way pushing connection established from pusher arm 33 to drive arm 38. From the description thus far, it will be seen that resetting motion can be transmitted to the current month's demand pointer 19 through the resetting pinion 39, and that resetting motion can be transmitted to the previous month's demand pointer 20 through the resetting pinion 26.

Mounted on the central spindle 25 between these two resetting pinions 26 and 39 are the aforementioned ratchet mechanism, slippage clutch mechanism and over-running clutch mechanism. The over-running clutch mechanism comprises a clutch housing or ring 41 having a hub portion which is freely rotatable upon the central shaft 25. As shown in Figures 4 and 5, this clutch ring 41 is formed with a cylindrical inner recess 43 in which revolves the clutching spider 44 and over-running clutching elements 45. These over-running clutching elements are in the form of balls or cylinders adapted to have a wedging grip between the interior surface 43 and sloping pockets 46 in the spider 44 when relative motion between the clutch ring 41 and spider 44 is in a direction tending to roll the balls outwardly in their tapered pockets 46. The clutching spider 44 is secured fast to the spindle 25, so that it always rotates directly with the drive arm 38 and current month's demand pointer 19. A disc 47 interposed between the resetting pinion 39 and clutching spider 44 serves to retain the over-running balls against lateral displacement from their pockets 46.

Rigidly secured to the outer clutch ring 41 is a ratchet wheel 51 having its ratchet teeth facing in a direction to prevent clockwise rotation of the ratchet wheel and of the clutch ring 41, as viewed in Figure 5. Engaging in the ratchet teeth 52 of this ratchet wheel is a ratchet pawl 53 which is pivotally supported on any suitable pivot pin 54 set between the supporting plates 10 and 11. A tension spring 55 normally holds the nose of the pawl 53 pressed into the ratchet teeth 52. Interposed between the ratchet wheel 51 and the resetting pinion 26 is the friction slippage clutch comprising a cupped friction spring 57 having radially extending spider arms which bear against the front side of the ratchet wheel 51. The central portion of this spring spider abuts outwardly against a washer 58 which is secured fast to the inner end of the resetting pinion 26. It will be seen from the description thus far that when the current month's demand pointer 19 is advanced upscale in a clockwise direction the inner clutching spider 44 of the over-running clutch will be rotated in a corresponding clockwise direction (Figure 5), so that the balls 45 will remain in the deep ends of the pockets 46 and, hence, will not tend to transmit rotation to the outer housing ring 41 of this overrunning clutch. In addition, clockwise rotation of this outer housing ring 41 is positively prevented by the blocking action of the pawl and ratchet mechanism 51—53. Hence, this upscale advancing movement of the pointer 19 in a clockwise direction is prevented from transmitting any corresponding clockwise rotation to the previous month's demand pointer 20, so that all upscale movements of the pointer 19 will always be independent of movement of the pointer 20. It will also be seen from the description thus far that by virtue of the friction slippage clutch 51, 57, the the previous month's demand pointer 20 can be reset downscale in a clockwise direction to its zero position without causing any corresponding clockwise movement (in an upscale direction) of the current month's demand pointer 19. The pawl and ratchet mechanism 51—53 prevents clockwise rotation of the pointer 19 at this time, and the slippage clutch 51, 57 permits the previous month's demand pointer 20 to be rotated in a clockwise direction relatively to the powl and ratchet mechanism 51—53. However, it will also be seen that in the second stage of the resetting operation, when the current month's demand pointer 19 is reset downscale in a counter-clockwise direction toward its zero position, such motion will rotate the clutching spider 44 in a counter-clockwise direction and cause the balls 45 to rotate toward the shallow ends of their pockets, into clutching engagement with the outer clutch ring 41. This will revolve the ratchet wheel 51 in a counter-clockwise direction, and such counter-clockwise rotation will be transmitted through the friction slippage clutch 51, 57 and hence through resetting pinion 26 to the previous month's demand pointer 20 for setting up on the previous month's indicator 18, 20 a reading corresponding with the reading previously existing on the current month's demand indicator 17, 19.

Referring now to the resetting mechanism which is actuated by the meter reader at the end of the month, or at the end of such other meter reading interval as is customary in that particular locality, attention is particularly directed to Figures 2 and 3, which show a resetting shaft 61 spaced considerably from the shaft axis 25 of the indicators, this resetting shaft being preferably below the indicator shaft. Said resetting shaft 61 has bearing support in the two supporting plates 10 and 11, and has a manually operable crank 62 secured to its front end on the front side of the dial plate 16. Secured to said setting shaft, between the plates 10 and 11 is a disc 64 which has a pin 65 extending entirely through the disc to project from opposite sides thereof. The outer surface of each end of the pin defines a sweep circle 66, indicated in dotted lines in Figure 3. The pin ends 65 in rotating through these sweep circles 66 are adapted to impart outward separating motion to front and rear resetting arms 67 and 68, the front arm 67 lying in front of the resetting disc 64, and the rear arm 68 lying in rear of said disc. These two resetting arms have concentric pivotal mounting for independent pivotal movement upon a common pivot pin 69, which extends between the two supporting plates 10 and 11. Fixedly secured to the hub portion of the front resetting arm 67 is a front resetting sector gear 71, and fixedly secured to the hub portion of the rear resetting arm 68 is a rear resetting sector gear 72. The gear tooth peripheries of these two sector gears are curved concentrically of the pivot axis 69, and the front sector gear 71 meshes with the resetting pinion 26 and the rear sector gear 72 meshes with the other resetting pinion 39.

In the normal position of the resetting disc 64, the resetting pin 65 occupies substantially the position shown in Figure 3, in which position the two resetting arms 67 and 68 can swing inwardly substantially into contact with the resetting shaft 61. The resetting disc 64 is yieldingly retained in this normal position by an indexing detent comprising a swinging arm 75 swinging about a stationary pivot pin 76 and carrying a detent pin 77 on its lower end adapted to swing into a V-shaped notch 78 formed in the periphery of the disc 64. A tension spring 79 hooked to the upper end of the arm 75 above the pivot 76 tends to swing the indexing pin inwardly into the notch 78. Referring to Figure 1, when the resetting disc 64 is in its normal position (shown in Figure 3) the resetting crank 62 stands in a substantially vertical position with an arrow 79 on the crank pointing downwardly into alignment with a "Stop" marker 81 inscribed on the dial plate 16. A direction arrow 82, also inscribed on the dial plate, indicates that the resetting crank 62 is to be rotated in a counter-clockwise direction by the meter reader.

Referring now to the operation of the device, when the unit is first installed the current month's demand pointer 19 and the previous month's demand pointer 20 will both occupy the zero positions illustrated in Figure 1. These zero positions, and also the maximum positions, of both pointers are defined by the pointers striking the side edges of the inwardly bent portion of the bearing bracket 28. As the load passing through the meter acts on the primary actuating element 33, it swings this element to different degrees. The initial swinging movement transmits an initial deflection through the drive arm 38 to the current month's demand pointer 19 for setting up an initial reading. As later degrees of movement of the demand actuated primary element 33 exceed previous movements, they successively transmit that additional increment of movement to the drive arm 38 for advancing the pointer 19 in a clockwise direction to successive positions for indicating the maximum demand up to that instant of time. Meanwhile, the previous month's demand pointer 20 has remained in its original position, since the overrunning action of the ball clutch 41—46 and the positive blocking action of the ratchet mechanism 51—53 has prevented motion being transmitted to the pointer 20. Let us assume that the meter readings are taken upon a monthly basis, and that the current month in which this meter has first been put into operation is the month of January. We will assume that when the meter reader comes to take a reading of the maximum demand indication during the latter part of January or the first part of February, the pointer 19 stands at a maximum demand reading of "8," such being the maximum demand for the month of January. After making the appropriate notation of this maximum demand reading on his record book, the meter reader then rotates the resetting crank 62 in a counter-clockwise direction through one complete revolution, so as to bring the arrow 79 back into registration with the "Stop" mark 81. Referring now to Figure 3, during the first half of this rotation of the resetting shaft 61, the front end of the resetting pin 65 moves through its sweep circle 66 for striking the inner or lower edge of the resetting arm 67, in the event that the previous month's demand pointer 20 is then indicating a maximum demand reading. However, under the assumed condition of the first month of operation, there will be no reading on the previous month's demand pointer, and, hence, the resetting arm 67 will stand substantially in the position shown in Figure 3 where the resetting pin 65 will clear or just contact this arm, there being no necessity of transmitting any resetting motion to the pointer 20 at this time. During the second half of the revolution of resetting pin 65, the rear end of this pin strikes the inner or upper edge of the resetting arm 68 and starts swinging this arm downwardly and outwardly. The resetting arm is swung down to a position of maximum reset where the sweep circle 66 of the pin 65 is just tangent to the inner edge of the resetting arm. The resulting motion of the rear sector 72 transmits a counter-clockwise rotation to the resetting pinion 39, which is transmitted directly through the central spindle 25 to the current month's demand pointer for swinging this pointer downscale in a counter-clockwise direction back to its zero position.

Simultaneously with this angular resetting motion of the current month's demand pointer 19, an advancing motion in a counter-clockwise direction of the same angular extent is concurrently transmitted to the previous month's demand pointer 20. This follows from the one-way clutching action of the ball clutch 41—46, the counter-clockwise rotation of the clutching spider 44 resulting in the balls 45 rolling outwardly into the constricted ends of the pockets 46, and, hence, transmitting corresponding rotation to the outer clutch ring 41. This in turn transmits counter-clockwise rotation to the ratchet wheel 51, which is freely permitted by the pawl 53, and such counter-clockwise rotation is transmitted through the friction slippage clutch 57 to the resetting pinion 26 and to the previous month's demand pointer 20. By virtue of the fact that this advancing motion which is thus imparted to the pointer 20 is of exactly the same angular extent as the resetting motion which is imparted to the pointer 19, it will be seen that the pointer 20 will be advanced in a counter-clockwise direction with respect to its oppositely reading scale 18, so that the pointer 20 will come to rest with a maximum reading of "8" on the scale 20 at the same time that the current month's pointer 19 comes to rest at the zero marking on its scale 17. The resetting operation is now complete, and it will be seen that the pointer 20 now establishes a maximum demand reading of "8" on the scale 18 as being the maximum demand reading for the month of January. The pointer 20 remains in this position during the entire month of February, or until the next resetting operation is performed. Let us assume that during the month of February the maximum demand established by the pointer 19 on the scale 17 only reached the value of "5." When the meter reader comes to take his reading and to perform the resetting operation at the end of February, he makes a notation in his record book of the maximum demand reading of "5" for the month of February, and he can also check his previous record against the maximum demand indication of "8" for the month of January. He now performs the resetting operation by rotating the resetting crank 62 through a complete revolution, the same as previously described. At this time, the resetting arm 67 is occupying a position in relatively close proximity to the shaft 61, because the pointer 20 stands with a reading of "8" on the scale 18. Hence, in the first half of the rotation of the resetting shaft the front end of the resetting pin 65 will engage the under side of the arm 67 and swing this arm upwardly and outwardly, so as to transmit resetting motion through the sector gear 71 to the front resetting pinion 26. When the resetting arm 67 swings out to a position tangent to the sweep circle 66, the previous month's demand pointer 20 has been swung back in a clockwise direction to the zero position on its scale 18. This clockwise motion of the pointer 20 is prevented from imparting any corresponding clockwise rotation to the pointer 19 (which might otherwise erroneously carry the pointer 19 beyond its maximum demand reading of "5") by reason of the fact that the pawl and ratchet mechanism 51—53 prevents this clockwise rotation of the pinion 26 being transmitted through the friction clutch 57 to the ball clutch 41—46. That is to say, this entire resetting motion of the previous month's demand pointer 20 is absorbed as slippage in the friction clutch 57, so that no part of this motion can accidentally be transmitted to the current month's demand pointer 19. Now that the previous month's demand pointer 20 has been reset to its zero position, the continued motion of the resetting pin 65 through the latter half of its rotation is free to perform the second part of the resetting cycle, namely, that of resetting the current month's demand pointer 19—and, simultaneously therewith, carrying the previous month's demand pointer 20 in an upscale direction to establish the same reading on its scale 18 that is now being obliterated from the current month's scale 17. This operation is the same as described above, i. e., the downward swinging motion of the resetting arm 68 imparting counter-clockwise rotation to the resetting pinion 39 and central shaft 25 for swinging the current month's demand pointer 19 back to its zero position. Concurrently therewith, the ball clutch 41—46 establishes clutching engagement for transmitting this counter-clockwise rotation through the ratchet wheel 51 and through the slippage clutch 57 to the resetting pinion 26 and previous month's demand pointer 20 for causing this pointer 20 to revolve up to a maximum demand reading of "5" on the previous month's demand scale 18. Thus, the device has been reset at the end of February, preparatory to setting up a maximum demand reading for the month of March, but the previous month's demand pointer 20 now stands in the position of indicating a maximum demand reading of "5" for the previous month of February. Thus, at all times the previous month's demand pointer 20 indicates the maximum demand of the preceding month. As previously stated, this is often advantageous for settling customer's disputes, and, in addition, it checks the accuracy of the record which has been set down for the previous month's reading, and also prevents the possibility of a reading becoming lost because of the performance of a resetting operation before the notation of the reading has been made. This additional apparatus for indicating the previous month's demand imposes no additional torque load on the load sensing element of the meter, because the overrunning clutch 41—46 frees such element from the additional apparatus during the normal operation of the device.

The primary utility of the invention is in conjunction with electric meters, but I wish it to be understood that the invention can also be applied to other meters for indicating the maximum demand of steam, water, gas oil, air, etc. The use of two scales 17 and 18 of different radii appears to be advantageous, but this arrangement is not essential, because a single set of scale markings might be used with the current month's digits running upscale in a clockwise direction, and the previous month's digits running upscale in a counter-clockwise direction. By the use of appropriate gearing, the two pointers 19 and 20 might also be arranged to have their upscale and downscale movements each in the same direction.

While I have illustrated and described what I regard to be the preferred embodiments of my invention, nevertheless, it will be understood that such are merely exemplary and that numerous modifications and rearrangements may be made therein without departing from the essence of the invention.

I claim:

1. In maximum demand indicating apparatus, the combination of a first indicator for indicating the maximum demand of the current month, a second indicator for indicating the maximum demand of the previous month, a demand actuated primary element for transmitting advancing movement to said first indicator; resetting mechanism comprising pin means manually rotatable along a circular path, two resetting arms located in the path of said pin means in such manner as to be actuated in succession, a sector gear and a cooperating pinion operatively interconnecting the first operated resetting arm and said second indicator to reset the latter to zero, and an additional sector gear and a cooperating pinion operatively interconnecting the second operated resetting arm and said first indicator to reset the latter to zero; and means operative during the resetting of said first indicator for causing said second indicator to be moved upscale through substantially the same range of movement that said first indicator is moved downscale in the resetting of the latter.

2. In maximum demand indicating apparatus, the combination of a first indicator for indicating the maximum demand of the current month, a second indicator for indicating the maximum demand of the previous month, said two indicators moving upscale in opposite directions, a primary element responsive to maximum demand for transmitting advancing movement to said first indicator, resetting means operative to first reset said second indicator to zero and to then reset said first indicator to zero, slippage clutch mechanism operatively connected between said first and second indicators, ratchet mechanism cooperating therewith for holding said first indicator against upscale movement while said second indicator is being reset to zero, and means operative during the resetting of said first indicator for causing said second indicator to be moved upscale through substantially the same range of movement that said first indicator is moved downscale in the resetting of the latter.

3. In maximum demand indicating apparatus, the combination of a first indicator for indicating the maximum demand of the current month, a second indicator for indicating the maximum demand of the previous month, said two indicators moving upscale in opposite directions, a primary element responsive to maximum demand for transmitting advancing movement to said first indicator, resetting means operative to first reset said second indicator to zero and to then reset said first indicator to zero, slippage clutch mechanism operatively connected between said first and second indicators, ratchet mechanism cooperating therewith for holding said first indicator against upscale movement while said second indicator is being reset to zero, and an over-running clutch operatively connected between said first indicator and said slippage clutch and ratchet mechanisms and operative during the resetting of said first indicator for causing said second indicator to be moved upscale through substantially the same range of movement that said first indicator is moved downscale in the resetting of the latter.

RET O. HAMILL.

REFERENCES CITED

The following references are of record in the file of this patent:

UNITED STATES PATENTS

| Number | Name | Date |
| --- | --- | --- |
| 2,123,977 | Wagner | July 19, 1938 |
| 2,245,393 | Fleischmann | June 10, 1941 |